US012617551B2

(12) United States Patent
Pacaud et al.

(10) Patent No.: US 12,617,551 B2
(45) Date of Patent: May 5, 2026

(54) METHOD FOR MOUNTING AN AXLE IN A BOGIE, AND ASSOCIATED INSTALLATION

(71) Applicants: SAFRAN LANDING SYSTEMS, Velizy-Villacoublay (FR); SAFRAN LANDING SYSTEMS UK LTD, Gloucestershire (GB)

(72) Inventors: Julien Pacaud, Moissy-Cramayel (FR); Armel Vachon, Moissy-Cramayel (FR); Grégoire De Laitre, Moissy-Cramayel (FR); Tom Boardman, Moissy-Cramayel (FR)

(73) Assignees: SAFRAN LANDING SYSTEMS, Velizy-Villacoublay (FR); SAFRAN LANDING SYSTEMS UK LTD, Gloucestershire (GB)

( * ) Notice: Subject to any disclaimer, the term of this patent is extended or adjusted under 35 U.S.C. 154(b) by 96 days.

(21) Appl. No.: 18/702,355

(22) PCT Filed: Oct. 21, 2022

(86) PCT No.: PCT/FR2022/052000
§ 371 (c)(1),
(2) Date: Apr. 18, 2024

(87) PCT Pub. No.: WO2023/067289
PCT Pub. Date: Apr. 27, 2023

(65) Prior Publication Data
US 2024/0417106 A1      Dec. 19, 2024

(30) Foreign Application Priority Data
Oct. 22, 2021     (FR) ...................................... 2111260

(51) Int. Cl.
*B64F 5/10*              (2017.01)

(52) U.S. Cl.
CPC ...................................... *B64F 5/10* (2017.01)

(58) Field of Classification Search
CPC ........................................................ B64F 5/10
See application file for complete search history.

(56) References Cited

U.S. PATENT DOCUMENTS

| | | | |
|---|---|---|---|
| 2007/0271790 A1 | 11/2007 | Bingham et al. | |
| 2009/0146388 A1 | 6/2009 | Rauch, Jr. | |
| 2016/0325825 A1* | 11/2016 | Baird ...................... | B64C 25/36 |

FOREIGN PATENT DOCUMENTS

| | | |
|---|---|---|
| CN | 108032078 B | 5/2018 |
| CN | 111891377 A | 11/2020 |

(Continued)

OTHER PUBLICATIONS

International Search Report in corresponding International Patent Application No. PCT/FR2022/052000, mailed Feb. 3, 2023, 6 pages.

*Primary Examiner* — Nirvana Deonauth
(74) *Attorney, Agent, or Firm* — Cozen O'Connor

(57) ABSTRACT
A method and system for mounting an axle in a bore of a bogie mounted on a landing gear of an aircraft, the landing gear being in a gear-down position, the bore extending in a substantially horizontal direction referred to as the axle installation direction, between a first open end and a second open end are disclosed. The method includes a) supplying a mobile bearing structure (30) comprising means for moving the axle (12) which are able to move along a direction substantially parallel to the axle installation direction, b) installing the axle (12) on the means for moving the axle, c) aligning the axis (C) of the axle (12) with the axis (B) of the bore (14), and d) inserting the axle (12) into said bore (14) of the bogie (16) by moving the means for moving the axle (12) along the direction substantially parallel to the axle installation direction.

18 Claims, 9 Drawing Sheets

(56) References Cited

FOREIGN PATENT DOCUMENTS

| | | | |
|----|----|----|----|
| CN | 112496702 | A | 3/2021 |
| DE | 102018115455 | A1 | 1/2020 |
| EP | 2663490 | A1 | 11/2013 |
| EP | 2842904 | A2 | 3/2015 |
| EP | 3090943 | A1 | 11/2016 |

* cited by examiner

METHOD FOR MOUNTING AN AXLE IN A BOGIE, AND ASSOCIATED INSTALLATION

CROSS-REFERENCE TO RELATED APPLICATIONS

This application is a US National phase Application of International Application No. PCT/FR2022/052000 filed Oct. 21, 2022, which claims priority to French Patent Application No. 2111260 filed Oct. 22, 2021, both of which are hereby incorporated in their entirety.

TECHNICAL FIELD

This disclosure concerns a method of mounting an axle in a bore of a bogie for an aircraft, and a system intended for implementing the method.

BACKGROUND

Conventionally, an aircraft such as an airplane comprises landing gear which is deployed during the airplane's takeoff and landing. The landing gear comprises at least one bogie extending in a longitudinal direction. One or more bore(s) comprising a first open end and a second open end traverse the bogie in a direction substantially transverse to the longitudinal direction of the bogie. When the bogie is installed on the aircraft and the landing gear is deployed ("gear-down"), an axis of each bore extends in a substantially horizontal direction, i.e. substantially parallel to the ground on which the airplane rests.

Each bore receives an axle carrying a wheel on each side of the bogie. During its service, the axle may develop defects that require replacement in order to ensure the safety of the aircraft during takeoff and landing.

To this end, during an axle maintenance operation, the assembly consisting of the bogie and the axles is dismantled from the landing gear and sent to a workshop. In a first step, the operator forcibly removes the axles from the bogie bores. Secondly, the bogie is positioned in such a manner that the axes of the bores are oriented vertically. In a third step, a new axle is aligned with a bore and then vertically engaged within it. This operation is repeated as many times as there are bores. It is understood that these maintenance operations are carried out in the workshop, which turns out to be complicated and expensive due in particular to the grounding of the aircraft.

SUMMARY

This disclosure improves the situation.

To this end, a method is proposed for mounting an axle in a bore of a bogie mounted on a landing gear of an aircraft, the landing gear being in a gear-down position, the bore of the bogie extending in a substantially horizontal direction referred to as the axle installation direction, between a first open end and a second open end, the method comprising:
  a) supplying a mobile bearing structure comprising means for moving the axle which are able to move along a direction substantially parallel to the axle installation direction,
  b) installing the axle on the means for moving the axle,
  c) aligning the axis of the axle with the axis of the bore,
  d) inserting the axle into said bore of the bogie by moving the means for moving the axle in the direction substantially parallel to the axle installation direction.

Because the axle is inserted into the bore of the bogie in the axle installation direction, which is substantially horizontal, the mounting method makes it possible to install the axle in the bore of the bogie without needing to remove the bogie from the landing gear. The axle can even be installed under the wing of the plane. This makes it possible to simplify mounting the axle in the bore as well as to accelerate the mounting of the axle in the bore, reducing the costs related to a grounded aircraft.

According to one aspect of the invention, the method comprises a step, prior to step d), which comprises introducing the axle in a horizontal position into a tank filled with liquid nitrogen, for a given time, for example one hour.

Introducing the axle into the tank filled with liquid nitrogen allows cooling the axle to a temperature of approximately −200° C., which causes contraction of the axle which facilitates its insertion into the bore. Once in the bore, the temperature of the axle rises to ambient temperature, which causes the axle to expand, leading to an increase in its outer diameter until it is automatically locked in place by its expansion in the bore at ambient temperature.

According to one aspect of the invention, step c) comprises:
  positioning a reference mark on the mobile bearing structure and in such a manner that the axis of the bore intercepts the reference mark, and
  positioning the axle so that its axis is aligned with the reference mark along the installation direction.

By positioning the reference mark so that it is intercepted by the axis of the bogie bore, alignment between the axis of the axle and the reference mark also implies that the axis of the axle is aligned with the axis of the bore. The axle can therefore be easily inserted into the bore with no risk of collisions between axle and bore during this insertion.

According to one aspect of the invention, the reference mark is arranged in a vertical plane comprising the installation direction, this plane corresponding to a lifting plane of the axis of the axle.

Because the reference mark is arranged in the lifting plane of the axis of the axle, it is sufficient simply to adjust the position of the axis of the axle in a substantially vertical direction in order to align the reference mark and said axis of the axle, which allows aligning the axis of the axle with the axis of the bogie bore.

According to one aspect of the invention, the method comprises mounting a laser beam device in the bore of the bogie so that the axis of the laser beam is coaxial with the axis of the bore of the bogie.

According to the invention, the laser beam will be visible on the reference mark. The axis of the laser beam being coaxial with the axis of the bore of the bogie, an alignment between the reference mark and the laser beam allows ensuring the alignment between the axis of the bore and the reference mark.

According to one aspect of the invention, step d) is preceded by a step comprising the mounting of a sleeve around a first end of the axle, said first end being arranged facing the bore of the bogie along the axle installation direction.

According to the invention, the sleeve may be made of a flexible material, such as plastic. This sleeve helps cushion any collisions that may occur between the axle and the bore of the bogie during step d).

According to another aspect, a system is proposed for implementing a method for mounting an axle in a bore of a bogie mounted on a landing gear of an aircraft, the landing gear being in a gear-down position, the bore extending in a substantially horizontal direction referred to as the axle installation direction, between a first open end and a second open end, the system comprising:

a mobile bearing structure, alignment means for aligning the axis of the bore of the bogie with the axis of the axle, means for moving the axle into a position of insertion into the bore of the bogie, and for mounting the axle in the bore of the bogie.

The system allows the axle to be mounted in the bore in a substantially horizontal direction. There is therefore no need to disassemble the bogie from the landing gear in order to mount the axle in the bore. The system could in particular be placed under the wing of the aircraft in order to mount the axle directly in this position. The system therefore allows simplifying the mounting of the axle and reducing its cost.

According to one aspect of the invention, the system further comprises a tank filled with liquid nitrogen.

The tank filled with liquid nitrogen allows the axle to be cooled before inserting it into the bore. This causes contraction of the axle which facilitates its insertion into the bore. Once in the bore, the temperature of the axle rises to ambient temperature, causing the axle to expand which allows fitting the axle tightly into the bore of the bogie without any further fastening element.

According to one aspect of the invention, the alignment means comprise a reference mark carried by the mobile bearing structure and a laser beam device shaped for installation in the bore of the bogie so that the axis of the laser beam is coaxial with the axis of the bore of the bogie.

According to the invention, a position of the reference mark will be adjusted so that the laser beam intercepts the reference mark. Because the laser beam axis is coaxial with the axis of the bore of the bogie, the system allows easily aligning the reference mark and the axis of the bore.

According to one aspect of the invention, the system further comprises means for moving the reference mark comprising at least one rolling element configured for moving the bearing structure along a horizontal plane, and at least one raising element for the bearing structure configured for moving the bearing structure in translation along a substantially vertical direction.

By means of the rolling element and the raising element, the reference mark may be moved along the horizontal plane and along the substantially vertical direction until the laser beam intercepts the reference mark, which allows ensuring the alignment between the reference mark and the axis of the bore.

According to one aspect of the invention, the bearing structure comprises an upper frame carried by a plurality of vertical uprights, the upper frame supporting the means for moving the axle into a position of insertion into the bore of the bogie and for mounting the axle in the bore of the bogie.

The means for moving the axle are in particular arranged so that, once the reference mark is aligned with the axis of the bore, the means for moving the axle move in a direction substantially parallel to the axis of the bore. This makes it easy to align the axle with the bore.

According to one aspect of the invention, the means for moving the axle comprise a rail carried by the upper frame and a hoist mounted for translational movement on the rail along the axle installation direction.

The hoist allows the axle to be lifted to the position of alignment between the axis of the axle and the axis of the bore. Because the hoist is mounted for translational movement on the rail along the axle installation direction, the axle is directly inserted into the bore using this movement of the hoist once the axle is aligned with the axis of the bogie bore.

According to one aspect of the invention, the reference mark is fixedly mounted relative to the rail and arranged in a plane comprising the axle installation direction and the direction of translational movement of the hoist on the rail.

The reference mark being fixedly mounted relative to the rail, the movements of the bearing structure due to the rolling element and the raising element do not change the relative position of the reference mark relative to the rail.

According to one aspect of the invention, the hoist is configured so that in the high position, the axle is necessarily positioned with its axis aligned with the reference mark.

The alignment between the axle and the reference mark is thus obtained by positioning the hoist in the high position. Alignment between the axle and the reference mark is therefore easily obtained and reduces the risk of error.

BRIEF DESCRIPTION OF DRAWINGS

Other features, details, and advantages will become apparent upon reading the detailed description below, and upon analyzing the attached drawings, in which.

DESCRIPTION OF EMBODIMENTS

In this description, the various elements will be defined in the three perpendicular directions of space. In particular, an orthonormal reference frame comprising a first direction X, a second direction Y, and a third direction Z which are orthogonal to each other will be used. First direction X and second direction Y are substantially horizontal, so as to form a substantially horizontal plane XY between them. Third direction Z is substantially vertical and forms a plane XZ with first direction X, as well as a plane YZ with second direction Y. Planes XZ and YZ are substantially vertical.

Figure 1:
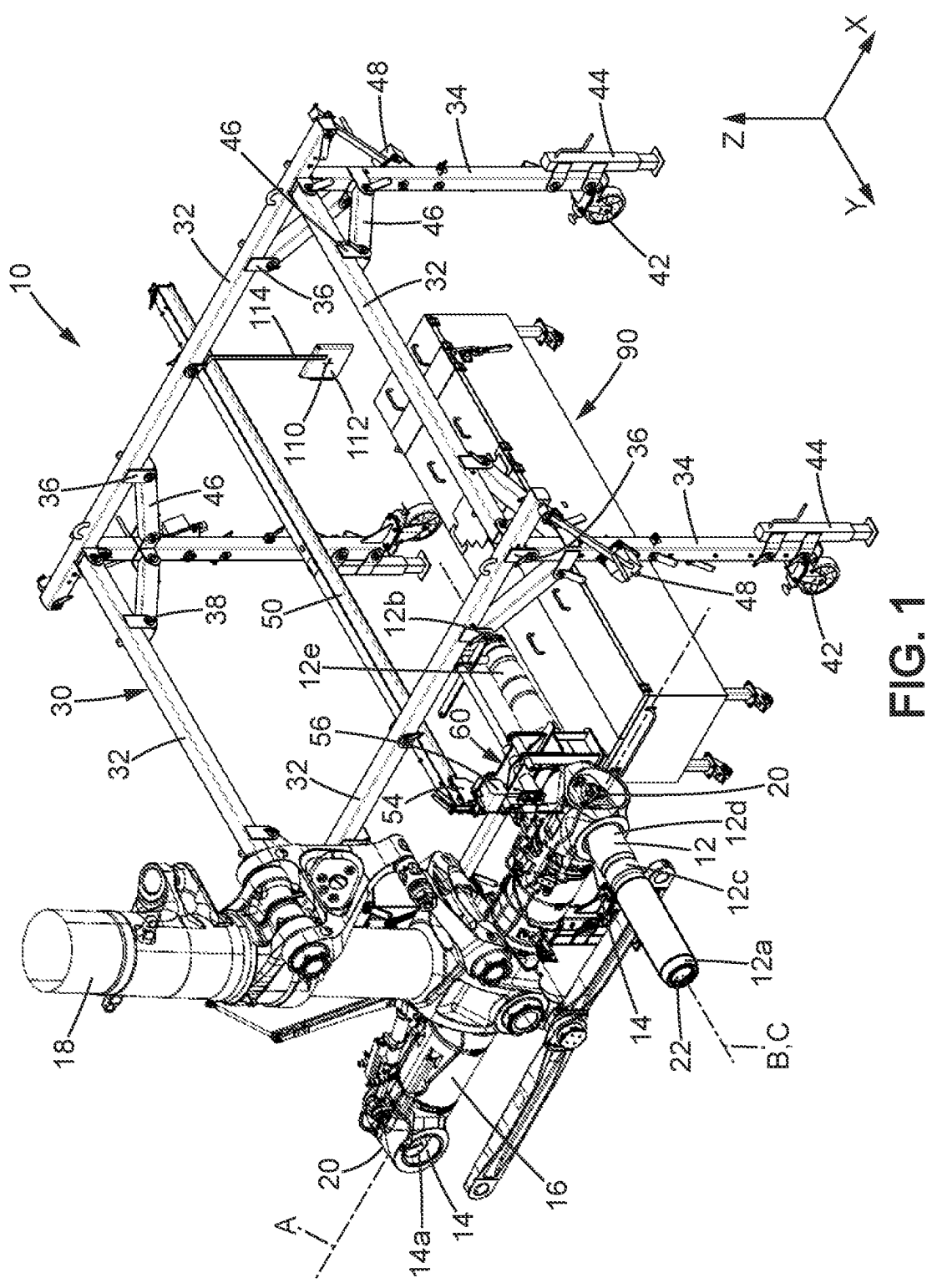
FIG. 1 is a schematic perspective view of a system for mounting an axle in a bogie installed on an aircraft landing gear, according to the invention.
Figure 2:
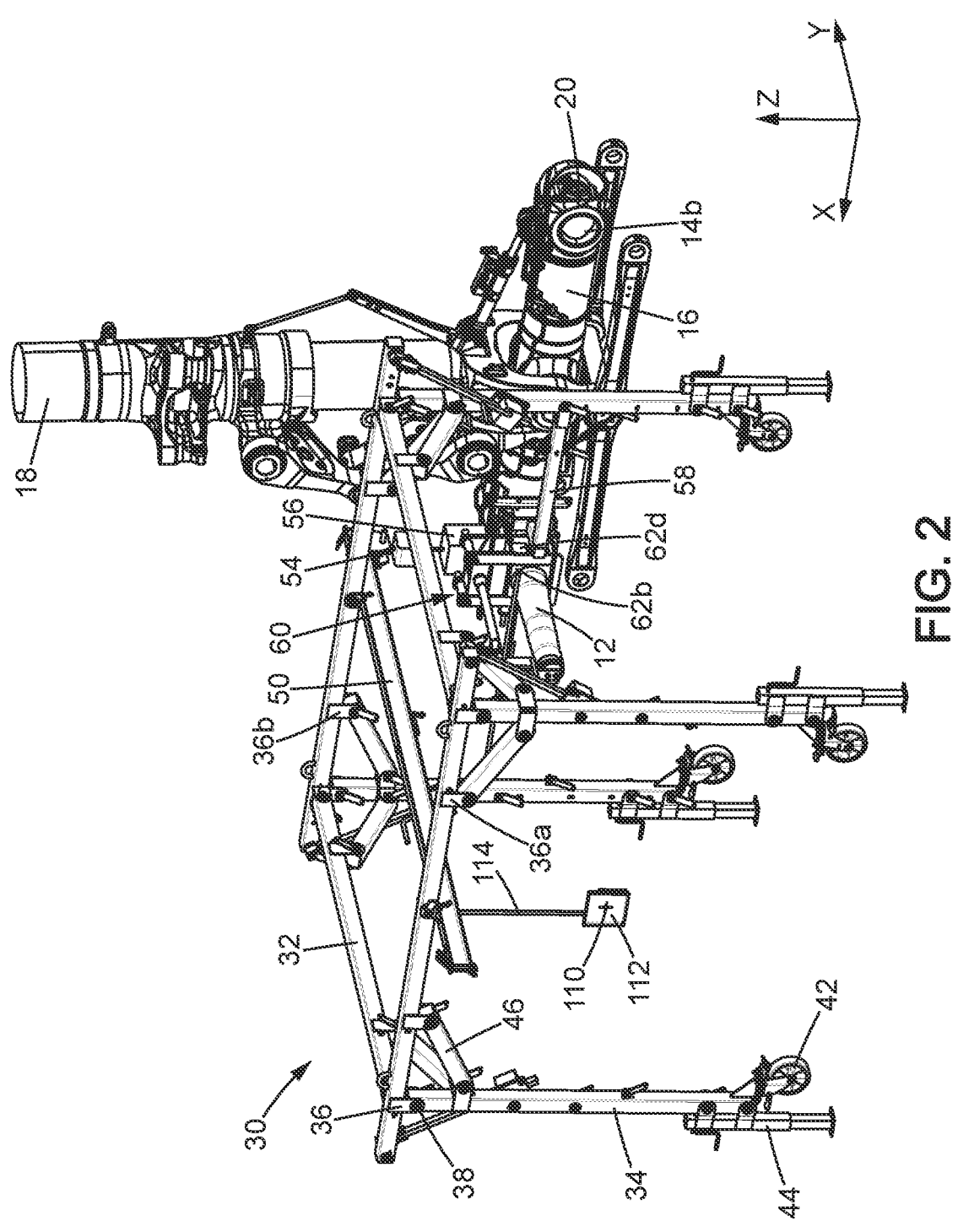
FIG. 2 is a schematic view of the system and the landing gear of FIG. 1, viewed in a different orientation.

FIGS. 1 and 2 show a system 10 for mounting an axle 12 in a bore 14 of a bogie 16 which is preferably mounted on a landing gear 18 of an aircraft, for example an airplane.

Bogie 16 has an elongate shape and extends between two open ends 20. Bogie 16 has in particular a substantially cylindrical shape of axis A. Advantageously, bogie 16 is made of titanium.

Bogie 16 comprises a plurality of bores 14. In the example of FIGS. 1 and 2, bogie 16 comprises two bores 14, but this number is non-limiting: bogie 16 may comprise a single bore or more than two bores.

Each bore 14 extends between a first open end 14a and a second open end 14b such that bore 14 is a through-bore. Each bore 14 has, for example, a substantially cylindrical section of axis B, axis B being substantially perpendicular to axis A of bogie 16. Advantageously, each open end 20 of bogie 16 is in communication with one of bores 14.

In FIGS. 1 and 2, landing gear 18 is in a gear-down position, meaning a normal position of use for landing gear 18 in which the wheels of the landing gear, not shown, are in contact with the ground. In this gear-down position, axis A of bogie 16 extends substantially parallel to first direction X and axis B of each bore 14 extends substantially parallel to second direction Y.

Axle 12 has an elongate tubular shape with a substantially cylindrical section, extending between a first end 12a and a second end 12b. Advantageously, a cavity 22 extends inside axle 12 between first end 16a and second end 16b. Axle 12 therefore comprises an outer wall and an inner wall, the inner wall defining cavity 22 of the axle. Cavity 22 is preferably substantially cylindrical with an axis C. When the axle is mounted in the bore of the bogie, axis B of the bore of the bogie and axis C of the axle are coaxial, as shown in FIGS. 1 and 2.

Axle 12 comprises a first end part 12c, a central part 12d, and a second end part 12e. Central part 12d extends between the first and second end parts 12c, 12e. First end part 12c and second end part 12e extend between central part 12d and, respectively, first end 12a and second end 12b of axle 12.

Figure 6:
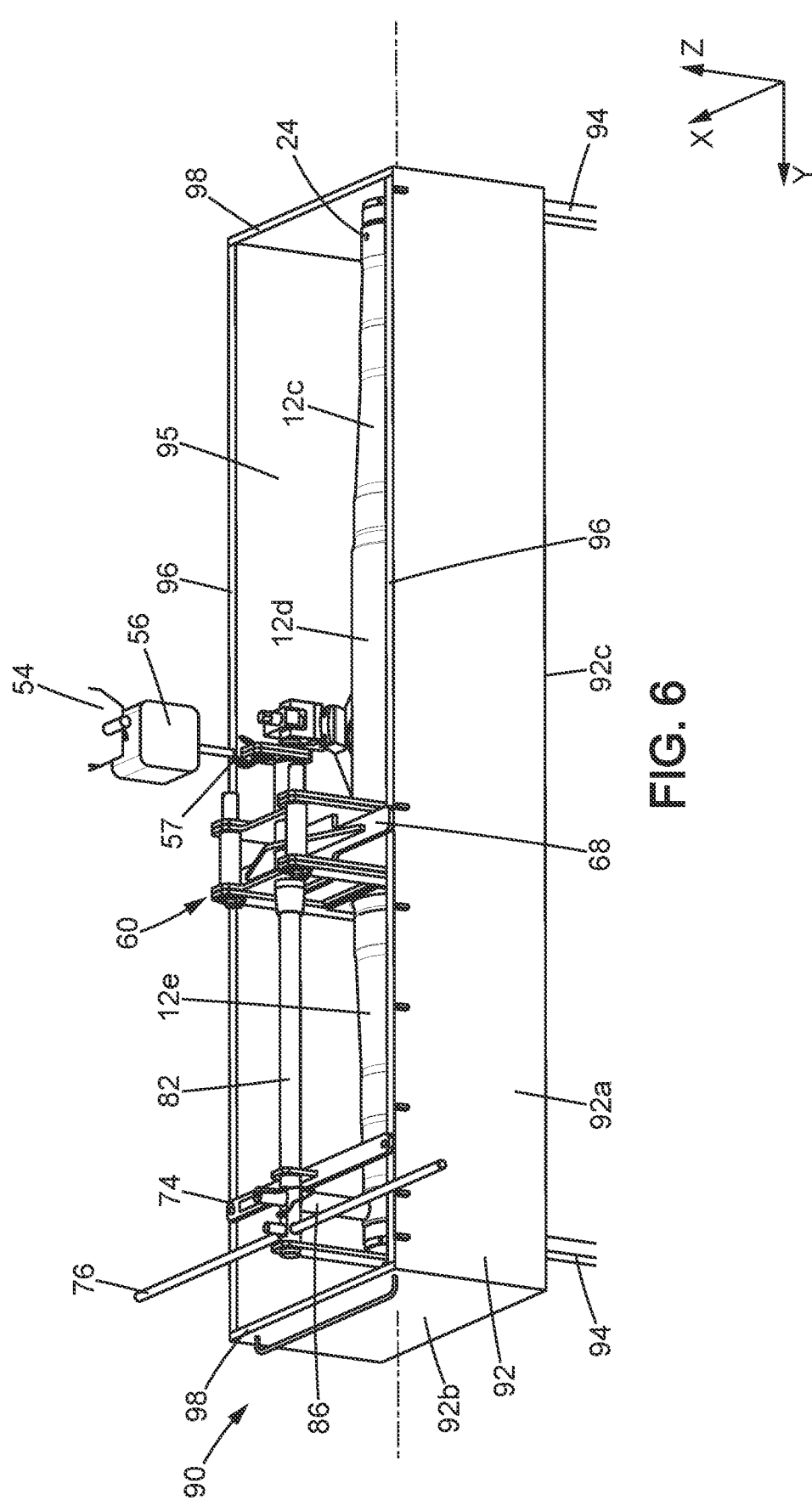
FIG. 6 is a schematic perspective view of the axle support of FIG. 4 supporting the axle and introduced into the tank of FIG. 5.

A first bore 24, which can be seen in FIG. 6, traverses the outer wall of axle 12 in a substantially radial manner. First bore 24 is arranged in first end part 12c of axle 12. A second bore, similar to the first bore but not visible in the figures, is preferably arranged in second end part 12e of axle 12. As will be detailed below, the second bore makes it possible to orient axle 12 and hold it in position in an axle support 60 which will be described in detail with reference to FIG. 4. Advantageously, the first bore and the second bore are aligned along an axis parallel to axis C of the axle. On central part 12d of axle 12, a third bore 26, illustrated in FIG. 7, traverses the inner and outer walls of axle 12. Third bore 26 is arranged at approximately 90° relative to first bore 24 around axis C. The third bore is advantageously at the same distance from first and second ends 12a, 12b of axle 12.

As will be detailed below, in particular with reference to FIG. 7, first and second end parts 12c, 12e advantageously have a cross-section that is significantly smaller than the cross-section of central part. "Cross-section" is understood to mean an external cross-section of axle 12 obtained by projection onto plane XZ when axle 12 is extending substantially parallel to second direction Y. Preferably, the cross-section of central part 12d of axle 12 has a dimension substantially equal to that of bore 14, so as to enable insertion of axle 12 into bore 14 as will be explained below.

Preferably, axle 12 is made of metal, for example steel.

We now describe the system, with reference to the figures.

Figure 3:
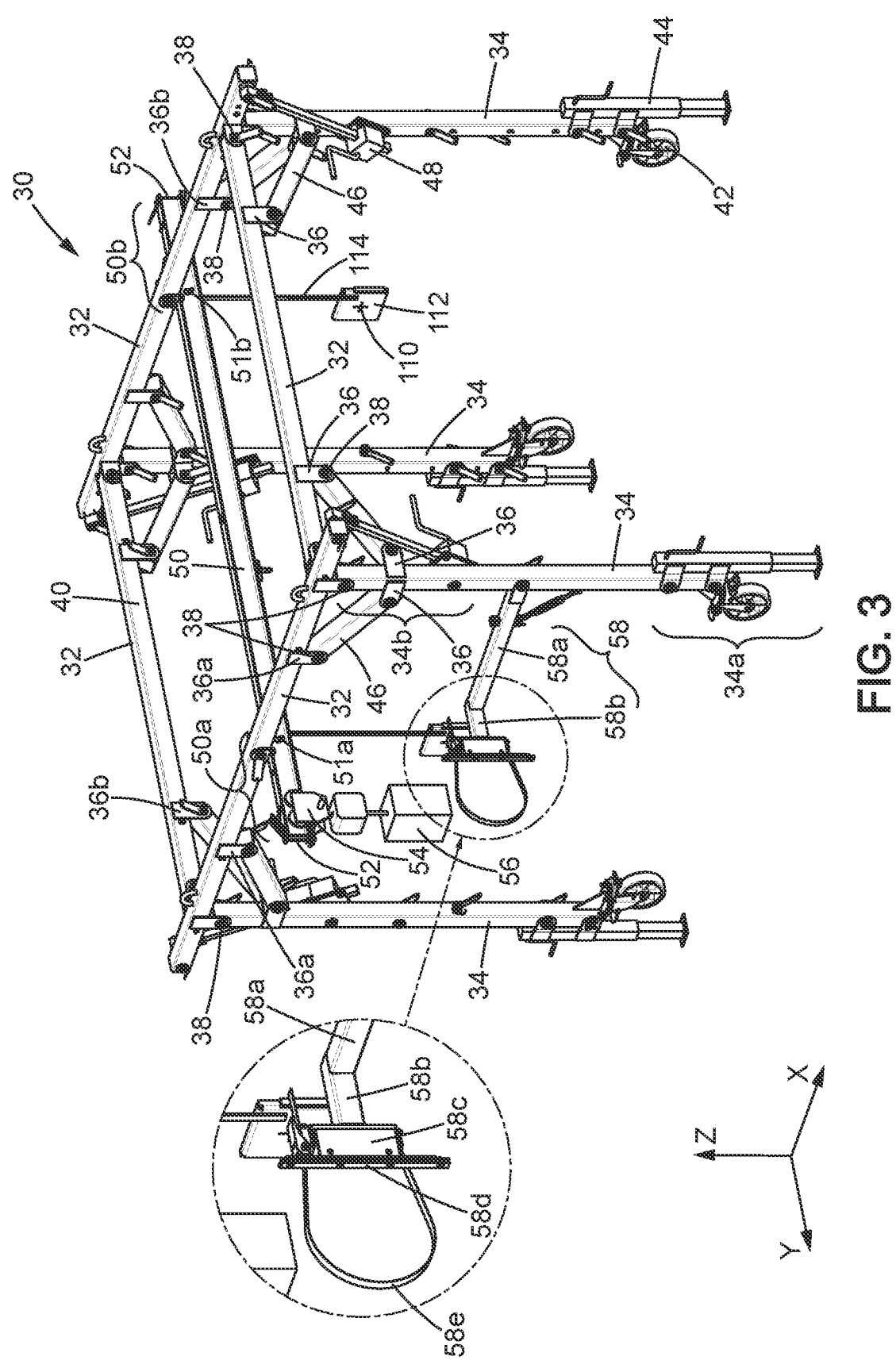
FIG. 3 is a schematic perspective view of a bearing structure of the system of FIGS. 1 and 2 according to the invention.

System 10 comprises a bearing structure 30, or gantry, of which FIG. 3 shows an isolated view. FIG. 1 illustrates bearing structure 30 in use and at the end of mounting an axle 12 in a bore 14 of a bogie 16.

Bearing structure 30 advantageously comprises several parts which can be disassembled. In particular, the bearing structure comprises a plurality of first uprights 32 and a plurality of second uprights 34. In a disassembled position of the bearing structure, not illustrated, these parts are separate from each other and can adopt any spatial position.

The arrangement of these parts will now be detailed when the bearing structure is in an assembled position, illustrated in FIGS. 1 to 3. In this assembled position, the plurality of first uprights 32 extends in a plane substantially parallel to plane XY, substantially horizontal, while the plurality of second uprights 34 extends in direction Z, substantially vertical. For this reason, and for semantic simplification, in the following the first uprights will be called "horizontal uprights" and the second uprights will be called "vertical uprights".

The bearing structure comprises at least three horizontal uprights 32 and in the present case it comprises four horizontal uprights 32. In the figures, two horizontal uprights 32 extend substantially in first direction X and two other horizontal uprights 32 extend substantially in second direction Y.

Each horizontal upright 32 comprises two opposite end portions. Each end portion is adapted to connect two horizontal uprights together. In particular, each end portion of horizontal uprights 32 extending substantially parallel to direction X is connected to one of the end portions of one of the horizontal uprights extending substantially parallel to direction Y. For this purpose, each end portion of the horizontal uprights may be provided with at least one connector 36 or at least one bore (not visible).

Each bore extends in a plane substantially parallel to plane XY and traverses the horizontal upright 32 which comprises it in a direction substantially perpendicular to the direction of extension of this upright. Thus, for example, for horizontal uprights 32 extending substantially in direction X, a bore made in one of their end portions extends substantially in direction Y.

Each connector 36 extends from the respective end portion along the direction of extension of the horizontal upright 32 with which this end portion is connected. According to one non-limiting exemplary embodiment of the invention, each connector 36 comprises two assembly tabs 36a, 36b arranged opposite each other. Each assembly tab 36a, 36b comprises a hole (not visible in the figures). The holes of the two assembly tabs 36a, 36b are aligned with each other.

In order to connect two horizontal uprights 32, horizontal upright 32 comprising the bore is arranged between assembly tabs 36a, 36b of the connector of the other horizontal upright 32 so that the holes of the assembly tabs and the bore are aligned. A removable connecting element 38, such as a rod, may then be arranged so that it traverses the two holes of connector 36 and the bore. The two horizontal uprights 32 are thus connected to each other and held in position relative to each other.

Once all horizontal uprights 32 are connected, they form an upper frame 40 of bearing structure 30.

Each end portion is further adapted to connect horizontal uprights 32 to vertical uprights 34 as explained below. For this purpose, each end portion of horizontal uprights 32 may comprise at least one connector 36 as described above, but extending substantially parallel to third direction Z.

Bearing structure 30 comprises at least three vertical uprights 34, and in the present case it comprises four. Vertical uprights 34 support the upper frame of the bearing structure, as can be seen in FIGS. 1 to 3. Each vertical upright 34 is arranged opposite another vertical upright 34 in first direction X, and opposite another vertical upright 34 in second direction Y.

Each vertical upright 34 comprises a first end portion 34a and a second end portion 34b which are at opposite ends.

First end portion 34a is positioned in a lower region, relative to third direction Z, of the respective vertical upright 34. First end portion 34a thus forms a foot of each vertical upright 34. As can be seen in FIGS. 1 to 3, each foot 34a is provided with a rolling element 42 and a raising element 44 for the bearing structure. Rolling element 42 is for example a wheel enabling the bearing structure to be moved along plane XY. Advantageously, wheel 42 comprises a stop brake which prevents movement of the wheel when the brake is actuated, and therefore movement of the bearing structure in plane XY. Raising element 44 is for example a cylinder which allows moving the bearing structure substantially along third direction Z. Bearing structure 30 is thus movable in the three perpendicular directions of space X, Y, Z. Raising element 44 is configured to be able to provide a continuous increase in height of bearing structure 30 from a low first position or minimum height position to a high second position or maximum height position. The continuous upward movement of the bearing structure makes it possible to achieve precise coaxial adjustment of axis C with plane XY containing axis B.

In another configuration, bearing structure 30 may comprise means for synchronously increasing the height all vertical uprights 34 so as to allow simultaneously raising all feet 34a together and by a single command.

Second end portion 34b is adapted to be connected to at least two horizontal uprights. More precisely, second end portion 34b is adapted to be connected to the end portions of at least two horizontal uprights. For this purpose, each second end portion 34b of vertical uprights 34 comprises one or more connectors 36 similar to what was described above, and/or one or more bores (not visible). In the non-limiting example of the figures, second end portion 34b of each vertical upright 34 comprises a bore (not visible), a connector 36 extending substantially in first direction X, and a connector 36 extending substantially in second direction Y.

In this configuration, in order to connect one of vertical uprights 34 to one of horizontal uprights 32, vertical upright 34 is placed between the assembly tabs of connector 36 of the respective horizontal upright which extends substantially parallel to direction Z. Vertical upright 34 is in particular placed between the assembly tabs of connector 36 so as to align the holes of the assembly tabs and the bore traversing the vertical upright. A removable connecting element 38 similar to the one used to connect two horizontal uprights can then be arranged so that it traverses the two holes of the connector and the bore of the vertical upright. Vertical upright 34 and horizontal upright 32 are thus connected to each other and held in position relative to each other.

Bearing structure 30 may further comprise a plurality of connecting bars 46. Each connecting bar 46 may be arranged between each free connector 36 arranged on the second end portion of vertical upright 34 and one of free connectors 36 arranged on the end portions of horizontal uprights 32. "Free connector" is understood to mean a connector which has not yet been used to connect two uprights together. As can be seen in FIGS. 1 to 3, each connecting bar 46 extends substantially diagonally between one of vertical uprights 34 and one of horizontal uprights 32. Connecting bar 46 comprises two ends, each advantageously comprising a hole (not visible in the figures) which makes it possible to connect connecting bar 46 to connectors 36 of the vertical 34 and horizontal 32 uprights which it connects. In particular, a removable connecting element 38 similar to the one used to connect two horizontal uprights will be used to connect each connecting bar between the respective vertical 34 and horizontal 32 uprights.

Bearing structure 30 may further comprise a plurality of winches. Each winch 48 may be arranged between a vertical upright 34 and a horizontal upright 36. Preferably, all winches 48 lie in a same plane, in particular plane XZ or plane YZ. In other words, each winch 48 is arranged between each of vertical uprights 34 and only each of those horizontal uprights 36 which extend substantially parallel to a single direction. For example, in FIGS. 1 to 3, four winches are installed, each winch connecting second end portion 34b of respective vertical upright 34 and one of the end portions of those horizontal uprights 32 which extend substantially parallel to first direction X. All winches 48 therefore extend along plane YZ in the example in FIGS. 1 to 3. In contrast, in these figures, no winch 48 is installed between the respective vertical upright 34 and the horizontal uprights 32 which extend substantially in second direction Y. No winch 48 therefore extends along plane XZ in the example of FIGS. 1 to 3.

Winch 48 makes it possible to give its respective vertical upright 34 a rotational movement around the direction of extension of the horizontal upright 32 to which winch 48 connects it.

Bearing structure 30 further comprises a rail 50. The rail is connected to upper frame 40, in particular to two horizontal uprights 32 arranged opposite each other. For example, in FIGS. 1 to 3, rail 50 is connected to horizontal uprights 32 which extend substantially in direction X such that rail 50 extends substantially parallel to direction Y. Rail 50 comprises a first end part 50a and a second end part 50b which are at opposite ends. Each of first and second end parts 50a, 50b is provided with a locking element 52 for rail 50 which is movable between a locking position and an unlocking position for rail 50. First end part 50a of the rail further comprises a first hole 51a for fixing a reference mark, which will be described below. Second end part 50b of the rail comprises a second hole 51b for fixing the reference mark.

The rail is advantageously H-shaped. Due to the H shape, a trolley 54 may be installed on rail 50. Trolley 54 is mounted to be movable in translation along the direction of extension of rail 50, in this case the direction substantially perpendicular to direction X.

The trolley is preferably a hoist-carrying trolley 54. A hoist 56 may thus be connected to rail 50 via trolley 54. Hoist 56 will then be integral with the movements of trolley 54 along the rail.

Hoist 56 comprises a chain (not shown) which is movable substantially along direction Z between a low position and a high position. This allows, as will be detailed below, the axle which will be mounted in the bore of the bogie to be moved from the ground to an alignment position between axis B of bore 14 and axis C of the axle.

Figure 7:
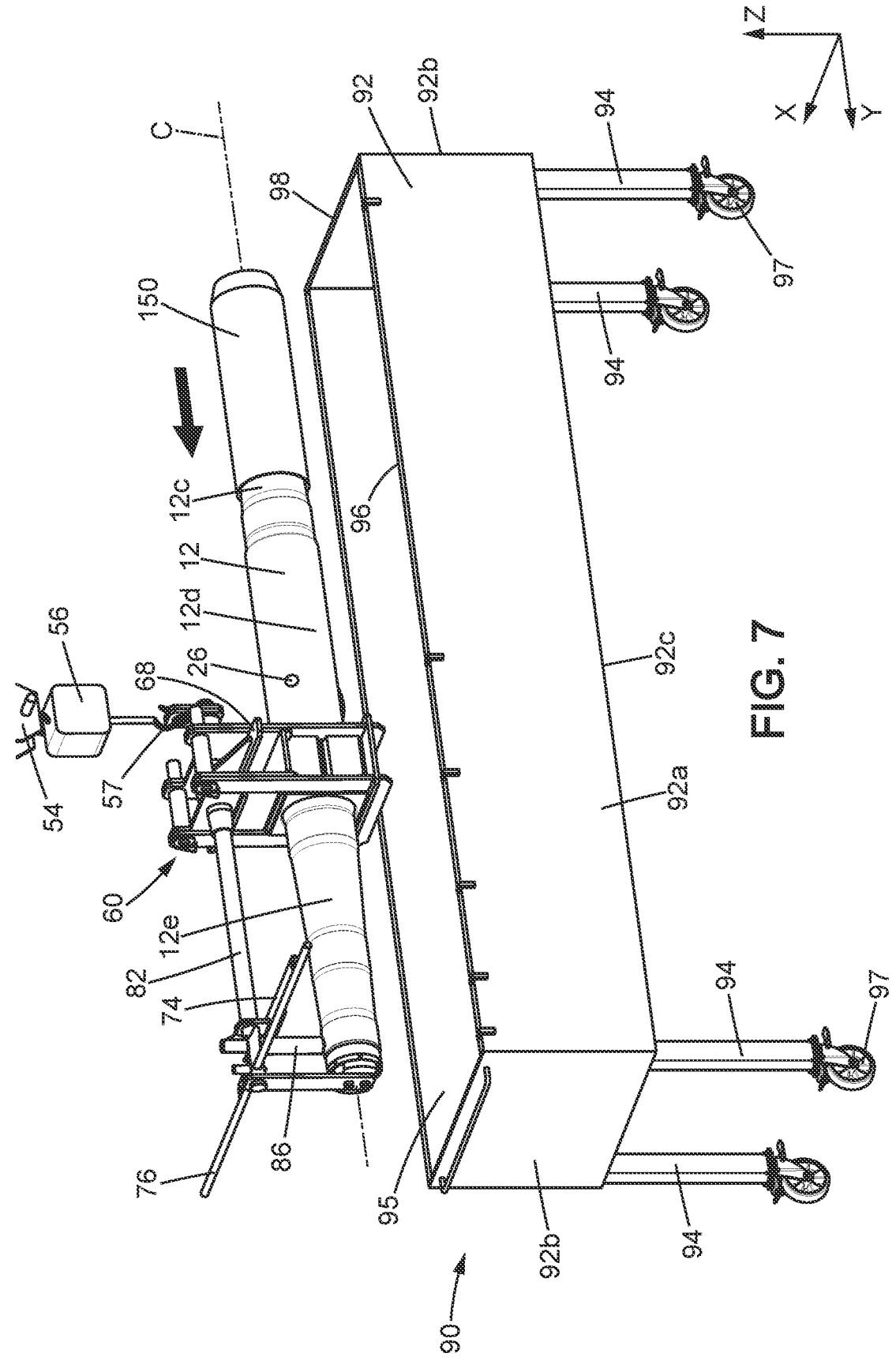
FIG. 7 is a schematic perspective view of the axle support of FIG. 4 supporting the axle, and of the tank of FIG. 5.

One end of the chain of hoist 56 is connected to a hooking device 57, which can be seen in particular in FIG. 7.

As will be explained below, rail 50, trolley 54, and hoist 56 constitute means for moving axle 12 into a position of insertion into bore 14 of bogie 16 and for mounting axle 12 in bore 14 of the bogie.

The system further comprises a contact arm 58 for contact with the bogie. As can be seen in particular in FIG. 3, the contact arm extends in an L shape from one of vertical uprights 34 of bearing structure 30. On a first portion 58a of the L shape, contact arm 58 extends substantially parallel to direction X, and is substantially aligned along direction Y with horizontal upright 32 placed in contact with first end portion 50a of rail 50. On a second portion 58b of the L, contact arm 58 projects relative to the bearing structure, substantially parallel to direction Y. Advantageously, second portion 58b of the L is located laterally relative to rail 50, which prevents contact arm 58 from interfering with movement of the axle during its installation in bore 14 of the bogie.

As can be seen in particular in the details of the enlargement in FIG. 3, second portion 58b of the L is connected to a support member 58c for the bogie. Support member 58c extends substantially parallel to third direction Z. Advantageously, support member 58c comprises a substantially concave support face 58d against which bogie 16 comes into contact. Support member 58c may further comprise a strap 58e. Strap 58e is for example arranged adjacent to support face 58d. Strap 58e allows fixing the bogie to the support member so as to limit the relative movements between bogie 16 and bearing structure 30 when mounting axle 12 in bore 14.

System 10 further comprises means for aligning axis B of the bore of the bogie with axis C of the axle. These means for alignment may comprise a reference mark 110, which can be seen in FIGS. 1 to 3, and a laser beam device 120, which can be seen in FIG. 8.

Reference mark 110 is arranged on one face of a target 112 carried by the bearing structure. In particular, the target is suspended from one of holes 51a, 51b provided in first end part 50a and second end part 50b of rail 50. In particular, target 112 is connected to one of holes 51a, 51b of the first and second end parts of the rail, by a suspension element 114. Advantageously, the length of suspension element 114 is chosen so that reference mark 110 and axis C of axle 12 are aligned along direction Z when axle 12 is carried by hoist 56 and the chain of hoist 56 is in the high position.

Reference mark 110 has for example a cross shape with a first line substantially parallel to direction Z and a second line substantially parallel to direction X when target 112 is suspended from the rail.

Laser beam device 120 is a device which emits a laser beam. Laser beam device 120 is shaped for installation in the bore of the bogie. More precisely, laser beam device 120 is shaped so that, when installed in the bore, the axis of the laser beam is coaxial with axis B of bore 14 of the bogie.

Advantageously, the laser beam has the same shape as reference mark 110. For example, the laser beam has the shape of a cross with a first ray substantially parallel to direction Z and a second ray substantially parallel to direction X when laser beam device 120 is installed in bore 14.

Figure 8:
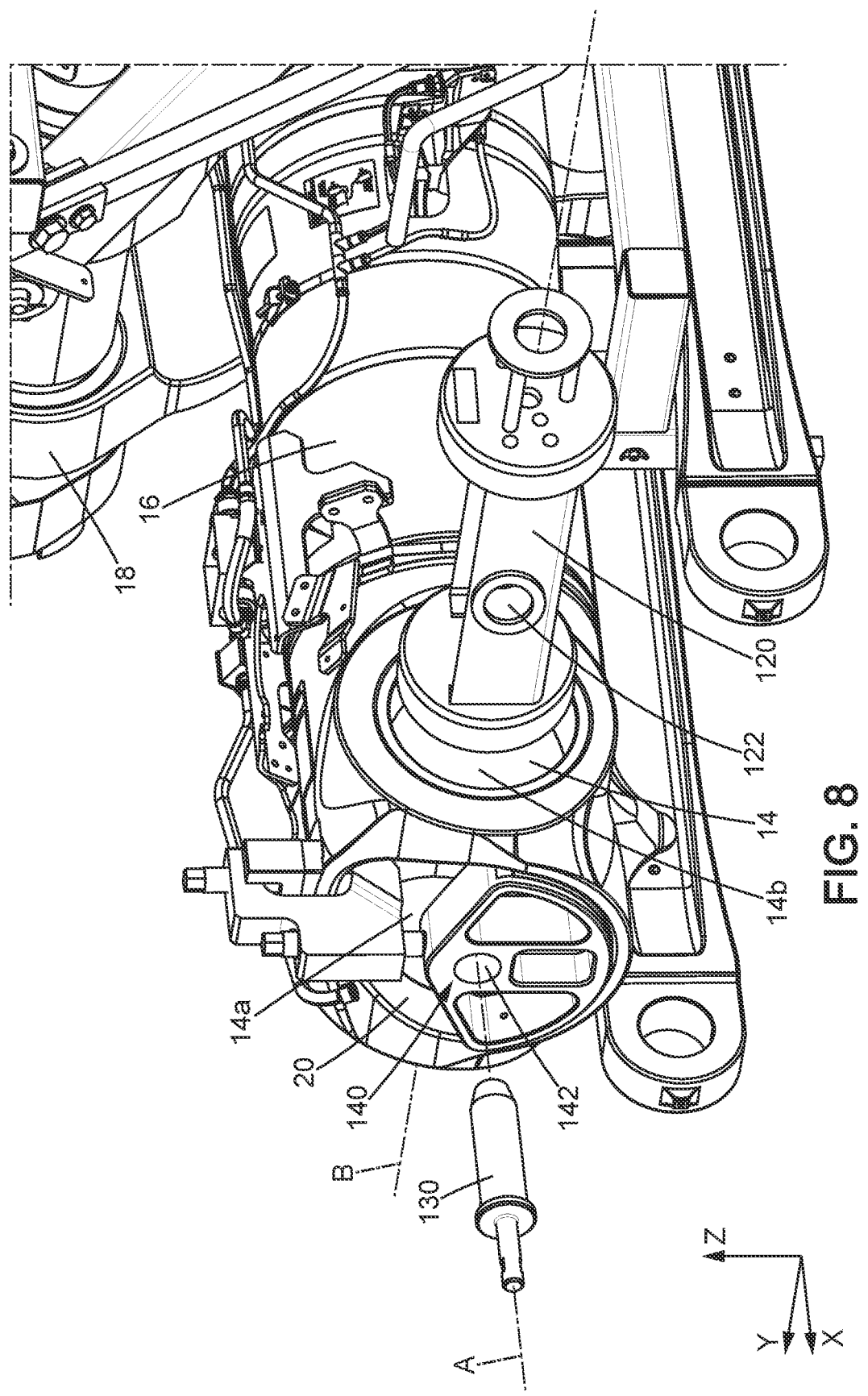
FIG. 8 is a schematic perspective view of a laser of the system of FIGS. 1 and 2 according to the invention and of details of the bogie.

As can be seen in FIG. 8, laser beam device 120 comprises a bore 122 located in a substantially central position of laser beam device 120 along direction Y. Bore 122 receives a retaining rod 130 to hold it in position, once laser beam device 120 is installed in a final position in the bore.

In order to identify the final position of the laser in the bore, the system may further comprise a guide tool 140 which can be seen in FIG. 8. The guide tool 140 is configured to be arranged on open end 20 of bogie 16 which is in communication with bore 14 where axle 12 will be installed. The guide tool 140 comprises a hole 142 having a shape and dimension substantially equal to those of bore 122 of laser beam device 120. When laser beam device 120 is in its final position in bore 14, hole 142 of guide tool 140 and bore 122 of the laser beam device are aligned. Retaining rod 130 may then be inserted into bore 122 of laser beam device 120 through hole 142 of guide tool 140.

Figure 9:
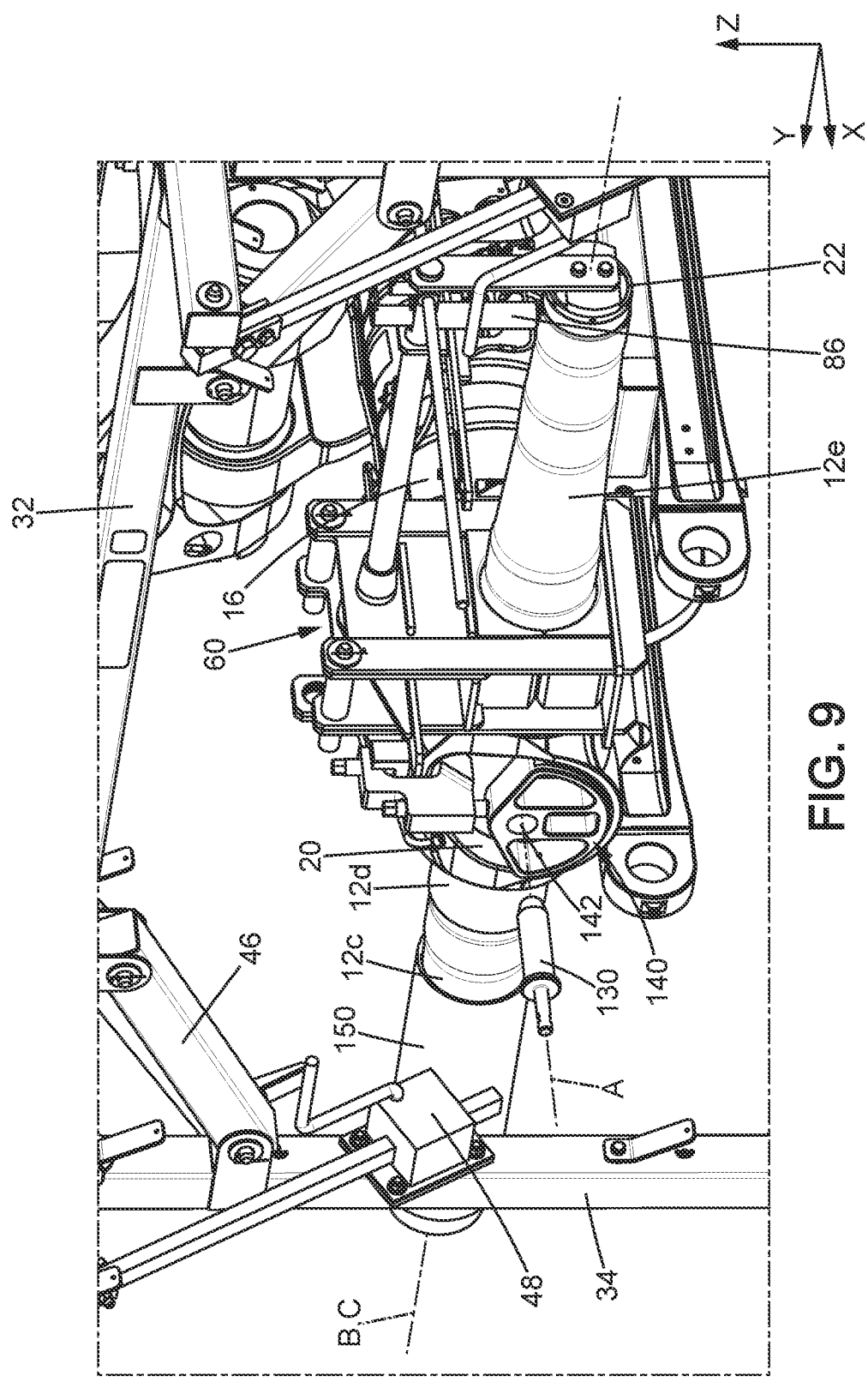
FIG. 9 is a schematic perspective view of details of the bogie when the axle supported by the axle support is inserted into the bore of the bogie.

As can be seen in FIG. 9, guide tool 140 also serves to identify a final position of axle 12 in bore 14, similar to the identification of the final position of the laser beam device. In particular, hole 142 of guide tool 140 is substantially equal in shape and dimension to third bore 26 of axle 12. When axle 12 is in its final position in bore 14, hole 142 of guide tool 140 and third bore 26 of the axle are aligned.

Retaining rod 130 also serves to hold axle 12 in its final position in bore 14. In particular, when hole 142 of guide tool 140 and third bore 26 of the axle are aligned, retaining rod 130 may be inserted into bore 26 of axle 12 through hole 142 of guide tool 140.

Figure 4:
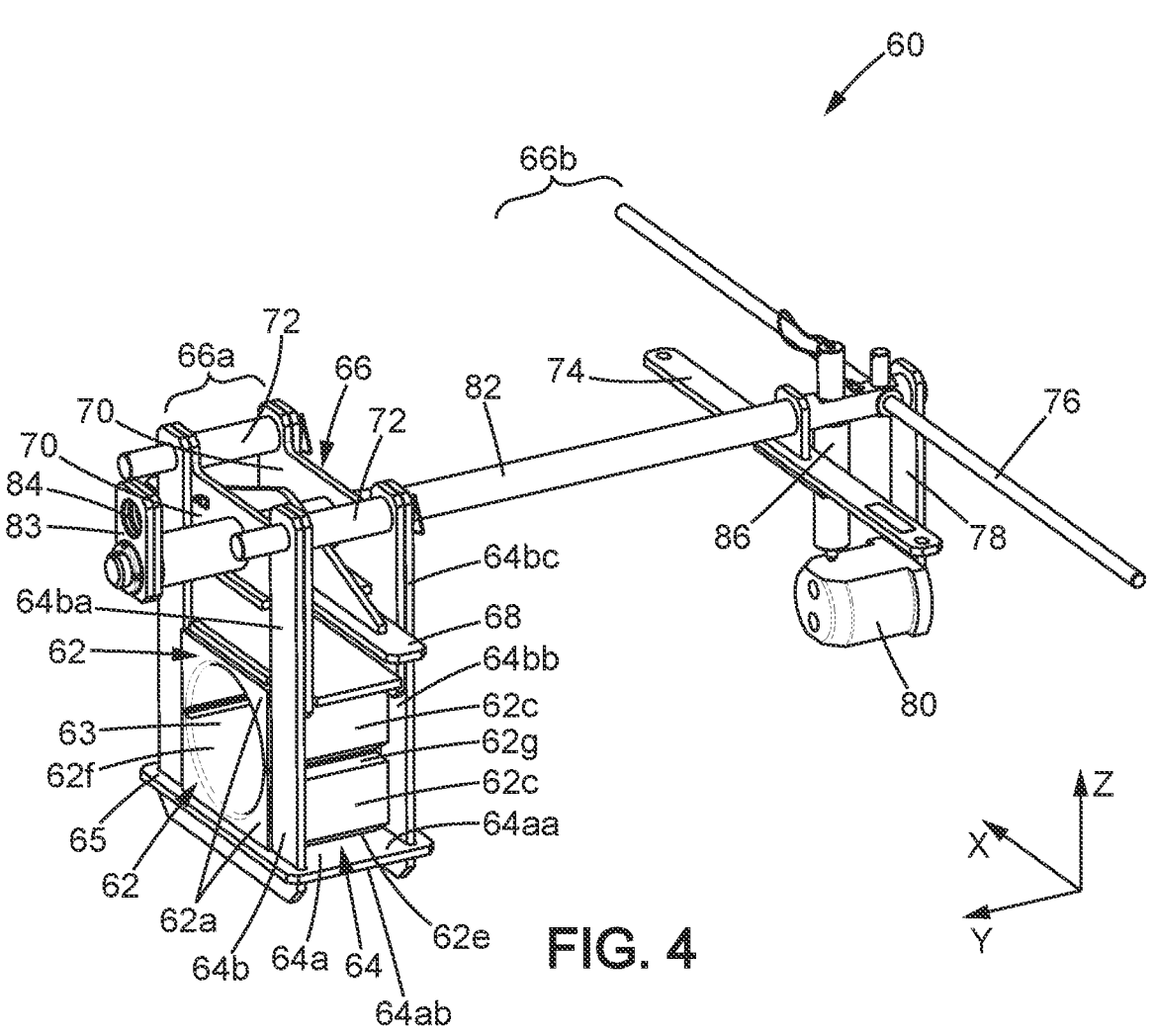
FIG. 4 is a schematic perspective view of an axle support of the system of FIGS. 1 and 2 according to the invention.

The system may further comprise an axle support 60, shown in FIG. 4. Advantageously, axle support 60 is made of metal, for example stainless steel due to its thermal and mechanical properties.

Axle support 60 comprises two half-collars 62, a collar support 64, and a spreader 66. Each of these parts of axle support 60 will be described in the following in relation to the position that it adopts in FIG. 4 using the orthonormal reference frame formed by directions X, Y, and Z. Note, however, that axle support 60 is advantageously removable, these parts advantageously being separable from each other. Thus, in a disassembled position of the axle support, not illustrated, these parts of the axle support are separate from each other and can adopt any spatial position.

The two half-collars 62 are preferably identical. The same references will therefore be used to describe the same parts of the two half-collars.

Each half-collar is composed of a block comprising a front face 62a, a rear face 62b (visible in FIG. 2), a first side face 62c, and a second side face 62d (visible in FIG. 2). Front face 62a and rear face 62b are opposite and substantially parallel to each other. In FIG. 4, front 62a and rear 62b faces extend substantially parallel to plane XZ. Preferably, front 62a and rear 62b faces are identical. Side faces 62c, 62d are opposite and substantially parallel to each other. In FIG. 4, the side faces extend substantially parallel to plane YZ. Preferably, the two side faces 62c, 62d are identical.

Each side face 62c, 62d connects front face 62a and rear face 62b of each half-collar 62. Advantageously, a shoulder (not visible in the figures) exists between front face 62a and each side face 62c, 62d, as well as between rear face 62b and each side face 62c, 62d of the half-collar. Each shoulder allows each half-collar 62 to be fitted into collar support 64, as will be explained below.

Each half-collar 62 further comprises a flat face 62e and a concave face 62f. Flat face 62e and concave face 62f connect front 62a and rear 62b faces of each half-collar 62. Advantageously, flat 62e and concave 62f faces are substantially perpendicular to side faces 62c, 62d of the respective half-collar 62.

Flat face 62e is substantially rectangular, and opposite to concave face 62f. Concave face 62f has a concavity. Two substantially flat edges 62g extend on concave face 62f between each end of the concavity and the respective side face 62c, 62d of the half-collar.

The substantially flat edges allow the two half-collars 62 to be stacked, so that their concavities face each other. In particular, in order to stack the two half-collars 62, substantially flat edges 62g of concave face 62f of one of the half-collars 62 are brought into contact with substantially flat edges 62g of concave face 62f of the other half-collar 62. The two half-collars 62 thus form a collar traversed by an opening 63 for receiving axle 12. As can be seen from FIG. 4, opening 63 for receiving axle 12 is defined by the concavities of the two half-collars. Advantageously, the shape and dimension of opening 63 for receiving axle 12 are substantially equal to the cross-section of central part 12*d* of axle 12. Axle 12 can thus be kept locked between the two half-collars 62 as will be detailed below.

Collar support 64 comprises a support surface 64*a* and four connecting segments 64*b*.

Support surface 64*a* is flat. In FIG. 4, the support surface extends substantially parallel to plane XY. The support surface comprises an upper face 64*aa* and a lower face 64*ab*. Upper face 64*aa* comprises a support area (not visible) and a peripheral area 65.

The support area has a shape and dimension substantially equal to the flat face of one of half-collars 62. The support area is thus intended to receive and support flat face 62*e* of one of half-collars 62. Peripheral area 65 surrounds the support area. Peripheral area 65 preferably has a substantially rectangular buckle shape.

Support surface 64*a* is configured to support the collar formed by the two half-collars 62 as indicated above.

Each connecting segment 64*b* has a substantially flat shape comprising an external face 64*ba*, an internal face 64*bb*, and two side edges 64*bc*. Each connecting segment 64*b* extends substantially perpendicularly to support surface 64*a*. In the current case, each connecting segment 64*b* extends substantially parallel to third direction Z.

As can be seen in FIG. 4, the four connecting segments 64*b* are arranged on peripheral area 65 of support surface 64*a*. Connecting segments 64*b* are advantageously facing each other in pairs along first direction X. The connecting segments are advantageously also facing each other in pairs along second direction Y. Preferably, connecting segments 64*b* are separated along direction X or along direction Y by distances which allow one of side edges 64*bc* and the internal face 64*bb* of each connecting segment 64*b* to be in contact with one of the shoulders arranged between side faces 62*c*, 62*d* and front 62*a* or rear 62*b* face of each half-collar 62. Each half-collar 62 is thus fitted into axle support 60 between the four connecting segments 64*b*, which prevents the collar from moving in first direction X and in second direction Y when the collar is installed on support surface 64*a*.

An end portion of each connecting segment that is opposite the support surface is traversed by a hole (not visible in the figures). Advantageously, the holes of connecting segments 64*b* arranged facing each other along direction X are aligned with each other. These holes allow connecting collar support 64 and spreader 66 as will be detailed below.

Spreader 66 comprises a front part 66*a* and a rear part 66*b*.

Front part 66*a* comprises a first arm 68 and two plates 70. First arm 68 extends substantially along direction X. In the non-limiting example of FIG. 4, plates 70 are separated along direction Y by a distance that is substantially less than the distance which separates two connecting segments 64*b* along direction Y. Thus, the two plates 70 can be arranged between the four connecting segments 64*b*. Each plate comprises two holes (not visible in the figures) which are arranged, along direction Y, facing the holes that traverse connecting segments 64*b* when the plates are arranged between segments 64*b*. Thus, a rod 72 can pass through the holes of the two plates 70 and of the two segments 64*b* arranged facing each other along direction Y. Each rod 72 therefore makes it possible to connect collar support 64 and spreader 66.

Rear part 66*b* of the spreader comprises an arm 74, a push bar 76, and an end portion 78. Arm 74 and push bar 76 extend substantially along direction X, while end portion 78 extends substantially along direction Z. End portion 78 is connected to a guide cylinder 80 arranged substantially facing push bar 76 along direction Z and extending substantially along direction Y.

Front 66*a* and rear 66*b* parts of spreader 66 are connected together by a crosspiece 82 which extends substantially along direction Y. Crosspiece 82 comprises, on one end near front part 66*a* of the spreader, a part 83 extending substantially along direction Z and comprising an orifice 84. Orifice 84 allows the attachment of hooking device 57 of the hoist. Axle support 60 can thus be moved in direction Z by means of the movement of the chain of hoist 56, and in translation along the direction in which rail 50 extends when hoist 56 integrally follows the movement of trolley 54. On the other end near rear part 66*b* of spreader 66, crosspiece 82 is traversed by a through-hole (not visible in the figures) which passes through crosspiece 82 substantially along direction Z. As can be seen in FIG. 4, this through-hole is adapted to receive a rod 86.

As is particularly visible in FIGS. 6 and 7, when axle 12 is received in opening 63 of the collar formed by the two half-collars 62, the axle is arranged so that guide cylinder 80 is inserted into cavity 22 of axle 12 and rod 86 is inserted into the second bore arranged on second end part 12*e* of axle 12. On the one hand, this arrangement allows maintaining the axle in position in axle support 60, and on the other hand, guaranteeing that axle 12 is oriented in a position which ensures that when axle 12 reaches its final position in bore 14, bore 26 and the hole in the guide tool are aligned and facing each other.

System 10 further comprises a tank 90, shown in FIGS. 1, 5, 6 and 7. Tank 90 comprises a vessel 92 and a plurality of substantially vertical uprights 94.

Vessel 92 has, for example, the shape of a rectangular parallelepiped, but other shapes are possible. In the figures, vessel 92 is defined by two longitudinal walls 92*a*, two transverse walls 92*b*, a lower wall 92*c*, and an upper wall 92*d*. Longitudinal walls 92*a* extend along two planes substantially parallel to each other and following plane YZ. Transverse walls 92*b* extend along two planes substantially parallel to each other and following plane XZ. Lower 92*c* and upper 92*d* walls extend along two planes substantially parallel to each other and following plane XY.

As can be seen from FIGS. 6 and 7, the inside 95 of vessel 92 forms a trough. The inside of vessel 92 advantageously has a length and a width respectively greater than the length and width of axle 12, which allows, as will be detailed below, introducing the axle into tank 90, as will be detailed below.

Each longitudinal wall has a thickness which defines a longitudinal edge 96 of the vessel. Similarly, each transverse wall has a thickness which defines a transverse edge 98 of the vessel.

As is clearly shown in FIG. 6, arms 68, 74 of the spreader, as well as push bar 76, have a length greater than the width of vessel 92. Thus, arms 68, 74 and push bar 76 rest on longitudinal edges 96 of vessel 92 when axle 12 and axle support 60 are arranged in the vessel. This prevents axle support 60 from touching the bottom of vessel 92 when it is placed inside vessel 92.

Figure 5:
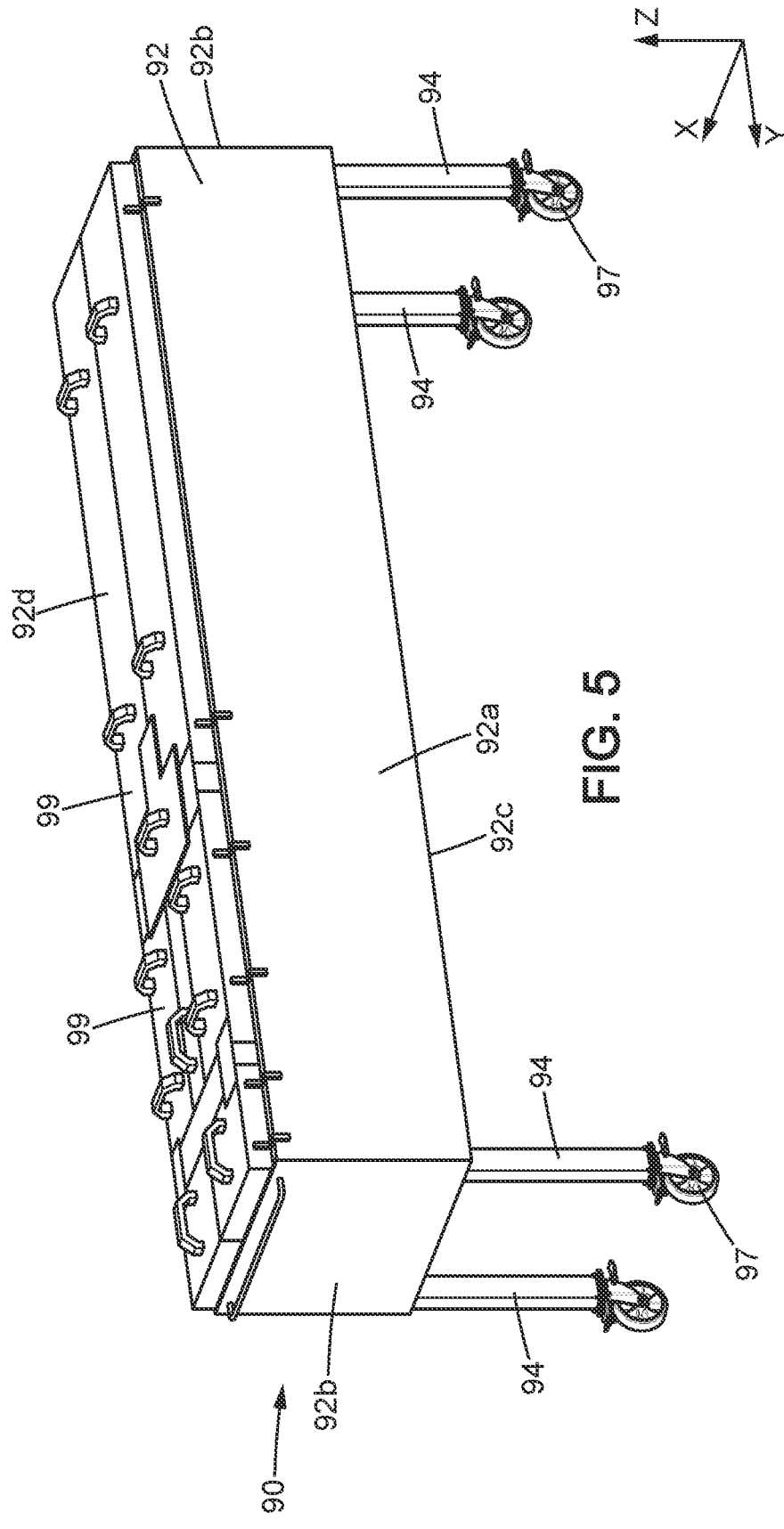
FIG. 5 is a schematic perspective view of a tank of the system of FIGS. 1 and 2 according to the invention.

As is clearly shown in FIG. 5, upper wall 92*d* of the vessel comprises a plurality of removable covers 99, so as to define an open position and a closed position of vessel 92. In the closed position, covers 99 are arranged on the vessel, to prevent access to the interior 95 of vessel 92. In the open position, all covers 99 are removed from vessel 92, which allows access to its interior 95.

Advantageously, one or more of covers 99 has a shape adapted to allow the passage of axle support 60, in particular arms 68, 74 and push bar 76, when axle 12 is introduced into the vessel. These covers, whose shape allows the passage of axle support 60, make it possible to define a third position of vessel 92, called the axle cooling position. In the axle 12 cooling position, all covers 99 are arranged on vessel 92, with the exception of the covers whose shape allows the passage of axle support 60. This makes it possible to close off vessel 92 as much as possible when axle 12 is inside, while allowing arms 68, 74 and push bar 76 to rest on longitudinal edges 96 of vessel 92, in a manner that limits heat transfers to the outside.

Vessel 92 is intended to be filled with liquid nitrogen in the axle cooling position.

Vessel 92 is supported by the plurality of substantially vertical uprights 94. These uprights extend substantially parallel to direction Z, from lower face 92d of the vessel. In the figures, tank 90 comprises four substantially vertical uprights 94 placed under each intersection between the longitudinal and transverse walls. Of course, tank 90 could comprise more than four uprights.

Advantageously, each vertical upright comprises a foot provided with a rolling element 97, such as a wheel. Wheel 97 allows moving tank 90 around within plane XY. The tank can thus easily be placed under bearing structure 30, as can be seen in FIG. 1.

The invention further relates to a method for mounting axle 12 in bogie 16 using the system of FIG. 1. In the following, we will describe in particular the method for mounting the axle in one of the bores of axis B of the bogie. In the following, a direction along axis B of the bore will be called the "axle installation direction".

The method firstly comprises the supplying of mobile bearing structure 30.

In certain cases, bearing structure 30 will already be assembled and it will only be necessary to move it along plane XY until support face 58d which is connected to contact arm 58 of bearing structure 30 comes in contact with bogie 16 installed in landing gear 18. Strap 58e of support member 58c will then be arranged around bogie 16 to prevent relative movements between bearing structure 30 and bogie 16.

In other cases, bearing structure 30 is not assembled beforehand. A non-limiting example of a method for assembling the bearing structure initially comprises assembling upper frame 40 by starting with connecting horizontal uprights 32 as explained above, then connecting vertical uprights 34 to upper frame 40 as also explained above. At this stage, vertical uprights 34 may be arranged substantially parallel to horizontal plane XY. This avoids having to use support means for upper frame 40 at a sufficient height to enable connecting vertical uprights 34 directly in their final position substantially parallel to direction Z. Rail 50 may also be connected to upper frame 40 as already explained.

In order to place vertical uprights 34 substantially parallel to third direction Z, winches 48 will be mounted between vertical uprights 34 and only those horizontal uprights 32 substantially parallel to a single direction, as indicated above. Actuation of each winch 48 imparts a rotational movement to the respective vertical upright 34, about the direction of extension of horizontal upright 32 to which vertical upright 34 is connected by the winch. This makes it possible to easily move vertical uprights 34 from the position substantially parallel to plane XY to the position substantially parallel to third direction Z.

Advantageously, before operating winches 48 so as to position vertical uprights 34 in their final position, the movements within plane XY of wheels 42 that are part of the two vertical uprights 34 located on a first side of bearing structure 30 relative to rail 50 are locked. To do so, the stop brake of wheels 42 that are part of the two vertical uprights 34 located on said first side of bearing structure 30 is actuated.

After locking wheels 42 of vertical uprights 34 located on the first side of the bearing structure relative to rail 50, winches 48 associated with the two vertical uprights 34 located on a second side of bearing structure 30 relative to rail 50 may be activated. Said second side is opposite to said first side of bearing structure 30. Actuation of the stop brake of wheels 42 on the first side of the bearing structure prevents the actuation, of winches 48 associated with the two vertical uprights 34 located on the second side of the bearing structure, from causing translational movement of the entire bearing structure 30 in plane XY. Winches 48 associated with the two vertical uprights 34 located on the second side of bearing structure 30 will be actuated until vertical uprights 34 of said second side of bearing structure 30 adopt their final position along direction Z.

Once vertical uprights 34 located on the second side of the bearing structure are placed in their final position substantially parallel to direction Z, connecting bars 46 which connect horizontal uprights 32 and vertical uprights 34 located on the second side of bearing structure 30 may be installed.

After unlocking the movement of wheels 42 associated with vertical uprights 34 on the first side of the bearing structure, the steps of actuating the stop brakes, actuating the winches, and installing the connecting bars can then be carried out on the opposite sides of bearing structure 30 relative to rail 50. This makes it possible to place vertical uprights 34 located on the first side of the bearing structure in the final position along direction Z.

Once all vertical uprights 34 are placed in the position substantially parallel to direction Z, raising elements 44 may be installed on each foot of vertical uprights 34. Similarly, contact arm 58 for contact with the bogie may be connected to the respective vertical upright 34.

In order to complete the assembly of the bearing structure, trolley 54 and hoist 56 must be installed. To install trolley 54 on the rail at least one of locking elements 52 of rail 50 must be moved to the unlocking position. This allows trolley 56 to be introduced onto the rail. Once trolley 54 is introduced onto rail 50, locking element 52 must be returned to the locking position for rail 50 in order to prevent trolley 54 from leaving rail 50 during its translational movement along the direction of extension of the rail. Hoist 56 is suspended from the trolley.

After all these steps, bearing structure 30 will be in its assembled position and may be moved along plane XY until support face 58d which is connected to contact arm 58 of the bearing structure comes into contact with bogie 16 installed in landing gear 18.

The method further comprises a step of installing the axle on the means for moving the axle. As indicated above, the means for moving the axle comprise rail 50, trolley 54, and hoist 56.

Initially, the step of installing axle 12 on the means for moving axle 12 allows positioning axle 12 on axle support 60. In particular, hooking device 57 of the hoist is connected to the axle, which is moved while suspended from hoist 56 until it is installed on one of half-collars 62 already placed on support surface 64a of axle support 64.

The other half-collar 64 and the spreader 66 may then be installed so as to lock axle 12 in opening 63, in accordance with the configuration described above with reference to FIGS. 4 and 6. In particular, when axle 12 is received in opening 63 of the collar formed by the two half-collars 62, axle 12 is arranged so that guide cylinder 80 is inserted into cavity 22 of axle 12 and rod 86 is inserted into the second bore arranged on second end part 12e of axle 12. As indicated above and as is clearly visible in FIG. 7, axle 12 will be locked in opening 63 by central part 12d.

Once axle support 60 is correctly installed around axle 12, hooking device 57 of hoist 56 is hooked to orifice 84 arranged near front part 66a of spreader 66 of axle support 60. Then, the chain of hoist 56 is gradually moved from its low position to its high position. The configuration of the axle support guarantees that the assembly formed by the axle and the axle support is held by its center of gravity, which allows keeping axle 12 in a position substantially parallel to horizontal plane XY during its movement via the means for moving the axle.

Moving the hoist chain to the high position allows aligning axis C of the axle and axis B of the bore, so that the axle extends along the axle installation direction.

The alignment of axes B and C of bore 14 and axle 12 may be obtained using the laser beam device and the reference mark. In particular, as explained above, laser beam device 120 is installed in bore 14 of the bogie so that axis B of bore 14 is aligned with the laser beam emitted by laser beam device 120. As indicated above, when installing laser beam device 120 in bore 14, guide tool 140 may be employed to detect the final position of laser beam device 120 in bore 14, and rod 130 may be used to lock laser beam device 120 in this final position.

Furthermore, as also indicated above, the chain of hoist 56 is configured so that in the high position, axis C of the axle is necessarily aligned with reference mark 110. Also, in order to guarantee that axis C of the axle and axis B of the bore are aligned, the method may comprise a step of aligning the laser beam and reference mark 110. For this purpose, reference mark 110 is initially carried by hole 51a of first end part 50a of the rail. Bearing structure 30 is then moved along direction Y by means of rolling elements 42, and along direction Z by means of raising elements 44, until the laser beam and reference mark 110 are coincident. If reference mark 110 and the emitted laser beam have the shape of a cross, the laser beam and reference mark 110 are coincident when the vertical line of reference mark 110 and the vertical ray of the laser beam are aligned, and when the horizontal line of reference mark 110 and the horizontal ray of the laser beam are aligned. After this first alignment between the vertical line and vertical ray, and between the horizontal line and horizontal ray, reference mark 110 is detached from hole 51a of first end part 50a of rail 50 and then carried by hole 51b of second end part 50b of the rail. If, in this position, the laser beam and the reference mark are not coincident, the bearing structure is again moved along direction Y and along direction Z until they are coincident, as explained above.

With the laser beam aligned with axis B of bore 14, the alignment between the laser beam and reference mark 110 implies that axis B and reference mark 110 are also aligned. Reference mark 110 is then arranged in a vertical plane which contains the axle 12 installation direction. As reference mark 110 and the hoist are carried by rail 50, the vertical plane comprising the axle installation direction as well as reference mark 110 also corresponds to a lifting plane of axis C of axle 12.

Note that reference mark 110 is fixedly mounted relative to the rail. In other words, when the bearing structure moves along direction Y and along direction Z, the relative position of reference mark 110 in relation to the rail does not change. Indeed, reference mark 110 and rail 50 are moved integrally with bearing structure 30. Rolling elements 42 and raising elements 44 therefore constitute not only means for moving bearing structure 30, but also means for moving reference mark 110.

Once axis C of the axle and axis B of bore 14 are aligned, the method comprises inserting axle 12 into bore 14 of the bogie, as can be seen in FIG. 9. In particular, to insert the axle into the bore, the hoist is connected to axle support 60, in particular to orifice 84 as indicated above. Trolley 54 then moves in the axle installation direction, which causes movement of hoist 56 and axle 12 in this same direction. Trolley 54 and hoist 56 are in particular moved along axle 12 installation direction until the final position of axle 12 in bogie 16 is identified using guide tool 140 as described above. Once in the final position, axle 12 is fixed in the bore by means of retaining rod 130.

In order to improve the securing of the axle in the bore, assembling by thermal difference may also be used. For this purpose, as can be seen in FIG. 6, the axle/axle support assembly is introduced into vessel 92 of tank 90. In particular, axle 12 is introduced into vessel 92 in a horizontal position, meaning along plane XY. Vessel 92 is then placed in its axle cooling position. As indicated below, in the axle cooling position all covers 99 are arranged on vessel 92, with the exception of the covers whose shape allows the passage of axle support 60. Vessel 92 is then filled with liquid nitrogen. Liquid nitrogen allows the axle to be cooled to approximately −200° C., which causes axle 12 to contract. In order to reach such a temperature, the axle is kept in tank 90 filled with liquid nitrogen for 1 hour for example. When the axle is extracted from tank 90, the contraction caused by the low temperatures facilitates insertion of the axle into bore 14. Once in bore 14, the temperature of the axle increases, causing expansion of the axle which leads to an increase in its outer diameter until it is automatically locked in place by its expansion in the bore at ambient temperature.

To improve this assembly by thermal difference, bore 14 of the bogie may be heated to a given temperature, for example +100° C. This causes the bore to expand. Insertion of axle 12 into bore 14 is thus facilitated. Once in the bore, the temperature of bore 14 decreases to ambient temperature, causing contraction of the bore which allows increased clamping of the axle in bore 14.

To heat bore 14, heating means, such as a resistor for example (not shown), may be placed in bore 14. Optionally, a temperature sensor (not shown) may also be inserted into bore 14 to control its heating.

Advantageously, before inserting axle 12 into bore 14, a sleeve 150, which can be seen in FIGS. 1 and 9, is arranged around the end of axle 12 which is facing bore 14 along the axle installation direction, in this case first end 12a of the axle. In other words, sleeve 150 is arranged around the end part of axle 12 which passes entirely through bore 14 in order to place axle 12 in its final position in bore 14. Sleeve 150 makes it possible on the one hand to avoid direct collisions between axle 12 and bore 14, and on the other hand to limit a loss of alignment between axis C of the axle and axis B of the bore which may be encouraged by the difference in cross-section between first end part 12c and central part 12d of the axle. Sleeve 150 is advantageously removed after the installation of axle 12 into bore 14.

As shown in FIG. 7, when axle 12 is introduced into tank 90 filled with liquid nitrogen, sleeve 150 may be installed around the first end of axle 12 after axle 12 is extracted from tank 90.

The invention claimed is:

1. A method for mounting an axle (12) in a bore (14) of a bogie (16) mounted on a landing gear (18) of an aircraft, the landing gear (18) being in a gear-down position, the bore (14) extending in a substantially horizontal direction referred to as the axle installation direction, between a first open end (14a) and a second open end (14b), the method comprising:

a) supplying a mobile bearing structure (30) comprising means for moving the axle (12) which are able to move along a direction substantially parallel to the axle installation direction, b) installing the axle (12) on the means for moving the axle, c) aligning the axis (C) of the axle (12) with the axis (B) of the bore (14), this step comprising:

positioning a reference mark (110) on the mobile bearing structure (30) and in such a manner that the axis (B) of the bore (14) intercepts said reference mark (110), and positioning the axle (12) so that the axis (C) is aligned with said reference mark (110) along the installation direction, d) inserting the axle (12) into said bore (14) of the bogie (16) by moving the means for moving the axle (12) along the direction substantially parallel to the axle installation direction.

2. The method according to claim 1, comprising a step, prior to step d), which comprises introducing the axle (12) in a horizontal position into a tank (90) filled with liquid nitrogen, for a given time.

3. The method according to claim 2, wherein the reference mark (110) is arranged in a vertical plane comprising the installation direction, the vertical plane corresponding to a lifting plane of the axis (C) of the axle (12).

4. The method according to claim 3, comprising the mounting of a laser beam device (120) in the bore (14) of the bogie so that an axis of the laser beam is coaxial with the axis (B) of the bore (14) of the bogie.

5. The method according to claim 4, wherein step d) is preceded by a step comprising the mounting of a sleeve (150) around a first end (12a) of the axle (12), said first end being arranged facing the bore (14) of the bogie along the axle installation direction.

6. The method according to claim 1, wherein the reference mark (110) is arranged in a vertical plane comprising the installation direction, this plane corresponding to a lifting plane of the axis (C) of the axle (12).

7. The method according to claim 6, comprising the mounting of a laser beam device (120) in the bore (14) of the bogie so that an axis of the laser beam is coaxial with the axis (B) of the bore (14) of the bogie.

8. The method according to claim 7, wherein step d) is preceded by a step comprising the mounting of a sleeve (150) around a first end (12a) of the axle (12), said first end being arranged facing the bore (14) of the bogie along the axle installation direction.

9. The method according to claim 1, comprising the mounting of a laser beam device (120) in the bore (14) of the bogie so that an axis of the laser beam is coaxial with the axis (B) of the bore (14) of the bogie.

10. The method according to claim 9, wherein step d) is preceded by a step comprising the mounting of a sleeve (150) around a first end (12a) of the axle (12), said first end being arranged facing the bore (14) of the bogie along the axle installation direction.

11. The method according to claim 1, wherein step d) is preceded by a step comprising the mounting of a sleeve (150) around a first end (12a) of the axle (12), said first end being arranged facing the bore (14) of the bogie along the axle installation direction.

12. A system for implementing a method for mounting an axle (12) in a bore (14) of a bogie (16) mounted on a landing gear (18) of an aircraft, the landing gear (18) being in a gear-down position, the bore (14) extending in a substantially horizontal direction referred to as the axle installation direction, between a first open end (14a) and a second open end (14b), the system comprising:

a mobile bearing structure (30), alignment means for aligning the axis (B) of the bore of the bogie with the axis (C) of the axle, the alignment means comprising a reference mark (110) carried by the mobile bearing structure (30), means for moving the axle (12) into a position of insertion into the bore (14) of the bogie (16), and for mounting the axle (12) in the bore (14) of the bogie.

13. The system according to claim 12, further comprising a tank (90) filled with liquid nitrogen.

14. The system according to claim 12, wherein the alignment means further comprise a laser beam device (120) shaped for installation in the bore (14) of the bogie so that an axis of the laser beam is coaxial with the axis (B) of the bore (14) of the bogie.

15. The system according to claim 12, further comprising means for moving the reference mark comprising at least one rolling element (42) configured for moving the bearing structure (30) along a horizontal plane, and at least one raising element (44) for the bearing structure (30) configured for moving the bearing structure (30) in translation along a substantially vertical direction (Z).

16. The system according to claim 12, wherein the bearing structure (30) comprises an upper frame (40) carried by a plurality of vertical uprights (34), the upper frame (40) supporting the means for moving the axle into a position of insertion into the bore (14) of the bogie and for mounting the axle in the bore (14) of the bogie.

17. The system according to claim 16, wherein the means for moving the axle comprise a rail (50) carried by the upper frame and a hoist (56) mounted for translational movement on the rail (50) along the axle installation direction.

18. The system according to claim 17, wherein the reference mark (110) is fixedly mounted relative to the rail and arranged in a plane comprising the axle (12) installation direction and the direction of translational movement of the hoist (56) on the rail.

* * * * *